US008197212B2

(12) United States Patent
Garcin et al.

(10) Patent No.: US 8,197,212 B2
(45) Date of Patent: Jun. 12, 2012

(54) POWER-ASSISTED CONTROL SYSTEM FOR A ROTORCRAFT

(75) Inventors: Patrice Garcin, Ensues (FR); Philippe Vincent, Nans les Pins (FR); Erwan Brocher, Toulouse (FR)

(73) Assignee: Eurocopter, Marignane Cedex (FR)

( * ) Notice: Subject to any disclaimer, the term of this patent is extended or adjusted under 35 U.S.C. 154(b) by 544 days.

(21) Appl. No.: 12/468,163

(22) Filed: May 19, 2009

(65) Prior Publication Data
US 2009/0317252 A1 Dec. 24, 2009

(30) Foreign Application Priority Data

May 19, 2008 (FR) ..................................... 08 02687

(51) Int. Cl.
*F01D 7/00* (2006.01)

(52) U.S. Cl. ........ 416/114; 244/220; 244/223; 244/234; 244/235

(58) Field of Classification Search .................. 244/220, 244/223, 234, 235; 416/114
See application file for complete search history.

(56) References Cited

U.S. PATENT DOCUMENTS

| 3,589,831 A | | 6/1971 | Lemnios et al. | |
| 5,058,825 A | * | 10/1991 | Rabouyt | 244/17.25 |
| 6,334,592 B1 | * | 1/2002 | Tomio et al. | 244/221 |

FOREIGN PATENT DOCUMENTS

| EP | 1037130 | 9/2000 |
| GB | 2085194 | 4/1982 |

* cited by examiner

*Primary Examiner* — Jerome Jackson, Jr.
*Assistant Examiner* — David Spalla
(74) *Attorney, Agent, or Firm* — Brooks Kushman P.C.

(57) ABSTRACT

An assisted control system for controlling the attitude of a rotorcraft comprises a flight control device; at least one control member configured to act on an aerodynamic element of the rotorcraft; a mechanical connection connecting the flight control device to the at least one control member, the mechanical connection including at least one connecting rod moveable in translation, a crank device pivotably disposed about a stationary support shaft passing through the crank device, and a motor including a drive rotor and a stator configured to facilitate a pivoting movement of the crank device about the stationary support; a motor control device configured to control a rotation of the drive rotor relative to the stator; and at least one sensor configured to measure information representative of an operation performed by the flight control device under pilot control and to deliver a signal to the motor control device.

14 Claims, 2 Drawing Sheets

POWER-ASSISTED CONTROL SYSTEM FOR A ROTORCRAFT

Priority is claimed to French Patent Application No. FR 08 02687, filed on May 19, 2008, the entire disclosure of which is incorporated by reference herein.

The present invention relates to a power-assisted control system for a rotorcraft, more particularly a helicopter. The invention is thus situated in the narrow field of rotorcraft control systems, in particular because of the specific features encountered in the field of aviation, e.g. as associated with safety requirements and environmental conditions.

BACKGROUND

A helicopter commonly has a main lift and propulsion rotor that is provided with a plurality of blades. The blades of the main rotor describe a very open cone having its plane of rotation perpendicular to the general lift generated by said main rotor. This general lift of the main rotor can then be resolved into a vertical lift force and a horizontal force that drives the helicopter in translation. Consequently, the main rotor does indeed provide lift and propulsion for a helicopter. Furthermore, by controlling the shape and the angle of inclination of said cone relative to the frame of reference of the helicopter, a pilot can direct the helicopter accurately.

In order to act on the cone, the blades are caused to flap so as to modify their angle of inclination relative to the drive plane of the main rotor, which drive plane is perpendicular to the mast of the main rotor. Consequently, the helicopter is provided with specific means for the purpose of varying the pitch of each blade, and consequently the aerodynamic angle of incidence of each blade relative to the incident stream of air through which the blade passes.

By varying the pitch of a blade, the lift it generates is varied and that has the consequence of causing the blade to flap. In order to control the general lift of the main rotor, both in magnitude and in direction, the pilot generally acts on the value of the pitch angle of each blade by causing the blade to turn about its longitudinal pitch axis. Thus, when the pilot orders collective variation of pitch, i.e. pitch variation that is identical for all of the blades, the pilot causes the magnitude of the general lift from the main rotor to vary so as to control the altitude and the speed of the helicopter. In contrast, collective pitch variation has no effect on the direction of the general lift.

In order to modify the direction of the general lift generated by the main rotor, it is appropriate to tilt said cone by varying pitch not collectively but cyclically. Under such circumstances, the pitch of a blade varies as a function of its azimuth angle, and during one complete revolution it passes through a maximum value and a minimum value that occur at opposite azimuth angles.

Cyclic variation of blade pitch gives rise to cyclic variation of the lift from the blades, and thus varies the tilt of the cone. By controlling cyclic variation of blade pitch, the pilot controls the attitude of the aircraft and its movement in translation. The flight controls enabling the pilot to control pitch, a collective pitch lever and a cyclic stick, are generally connected to three servo-controls via a mechanical connection referred to as "linkage" that is connected to the non-rotary plate of a cyclic swashplate. Furthermore, the rotary plate of the cyclic swashplate is mechanically connected to each of the blades by a pitch control rod.

When the pilot seeks to modify the collective pitch of the blades, action on the collective pitch lever instructs the three servo-controls to raise or lower the cyclic swashplate as a whole, i.e. both the rotary and the non-rotary plates thereof. The pitch control rods are thus all moved through the same distance, which implies that the pitch of all of the blades is varied by the same angle.

In contrast, in order to vary the cyclic pitch of the blades so as to direct the helicopter in a given direction, the pilot tilts the cyclic stick appropriately so as to cause at least one of the servo-controls to move. The cyclic plate does not move vertically but instead tilts relative to the mast of the main rotor. Each pitch control rod is thus moved, thereby generating pitch variation for each blade.

The mechanical connection is also provided with at least one connecting rod and with at least one crank means for connecting the pilot's flight controls of the servo-controls. This mechanical connection is also provided both with a mixer unit that enables the cyclic stick and the collective pitch lever to act independently of each other, and also with a phasing unit that enables the cyclic swashplate to tilt about two perpendicular axes in heavy helicopters. This mechanical connection is thus in general very long and heavy. Under such conditions, the pilot can have difficulty in moving the cyclic stick or the collective pitch lever, given the force that needs to be applied, particularly if the helicopter is itself heavy.

A first solution consists in using electric flight controls as suggested in documents WO 2005/002963 or US 2007/0102588. Nevertheless, that first solution is difficult to implement, particularly on existing rotorcraft. Consequently, manufacturers have remedied the problem posed by adding a hydraulic or pneumatic power assistance system. Known systems providing power assistance consist in a block of actuators acting dynamically merely as reducing cranks, the block of actuators being arranged between the bottom crank means and the mixer unit, for example.

Nevertheless, those power-assistance systems are bulky and heavy. In addition, they run the risk of leaking, hydraulically or pneumatically, thereby leading to a loss of effectiveness. Finally, the gas in pneumatic power-assistance systems is sensitive to variations in temperature, where such variations are unfortunately frequent in aviation, while the fluid used in hydraulic power-assistance systems contains polluting chemicals.

SUMMARY OF THE INVENTION

An aspect of the present invention is to provide a power-assisted control system for a rotorcraft that enables the above-mentioned limitations to be overcome. Another aspect of the invention is to provide a control system that is lightweight, reliable, and clean from an ecological point of view.

According to the invention, a power-assisted control system for the attitude of a rotorcraft comprises at least one flight control means, e.g. a cyclic stick, and at least one control member that acts on aerodynamic elements of the rotorcraft, such as servo-controls acting on the blades of the main rotor of a rotorcraft. The control system is also provided with a mechanical connection connecting the flight control means to the control member, the mechanical connection being provided with both at least one connecting rod that is movable in translation and at least one crank means suitable for pivoting about a stationary support shaft passing therethrough.

The control system is remarkable in that the crank means include a motor comprising a drive rotor and a stator incorporated in the crank means to facilitate turning movement thereof, the control system is provided with at least one sensor and motor control means, said at least one sensor measuring information representative of the operation performed by the flight control means under the control of a pilot and sending a signal relating to said information to the motor control means so that the motor control means can cause the drive rotor of the motor to turn relative to the stator of the motor. Thus, the crank means constituted partially active crank means.

When the pilot moves a flight control, the pilot acts mechanically to cause the crank means to tilt, since the crank means are mechanically connected to the flight control. Nevertheless, and simultaneously, the motor of the system also requires the crank means to turn. The sensor measures information relating to the movement of the flight control means by measuring a force exerted on a connecting rod or by measuring the displacement of the flight control means, respectively when the sensor is a force sensor or a displacement sensor, and delivers a signal to the motor control means to inform them about the movement of the flight control means. The motor control means then adjust the angular position of the motor drive rotor relative to the stator and thus generate a force on the crank means.

Consequently, the control system assists the pilot insofar as the motor of the crank means provides a first fraction and only a fraction of the forces to be applied to the crank means, the second fraction of the forces that are to be applied thereto being delivered by the pilot. The control system presents small size and weight since the motor is incorporated in the crank means.

In addition, safety is guaranteed since motor malfunction does not prevent the flight control system from operating properly, given that the pilot can still cause the crank means to turn, even if that requires more force to be applied.

In order to enhance this safety aspect of the invention, the motor is a brushless motor. Conventionally, such a brushless motor comprises a drive rotor having a plurality of magnets distributed equidistantly around its circumference, while the stator is provided with a plurality of electromagnetic modules. An inverse disposition can also be envisaged, the drive rotor having the electromagnetic modules while the stator is magnetized. By electrically powering the modules in sequence, a magnetic field is created suitable for causing the drive rotor of the motor to turn. The lack of brushes limits friction, thereby increasing the reliability of the motor and the safety of the control system.

In addition, for crank means comprising a transition zone with first and second branches respectively connected to the flight control means and to the control member, each via at least one connecting rod, and with the first and second branches being connected to the transition zone, it is preferable for the motor to be incorporated in the transition zone of the crank means. The transition zone may then optionally be cylindrical and hollow so as to be able to receive at least the stator of the motor. Since the transition zone has a stationary support shaft passing therethrough, the stator is secured to the support shaft of the crank means by conventional fastener means, pins, screws, rivets, or indeed adhesive.

In a first embodiment, the drive rotor that surrounds the stator of the motor is secured by adhesive or by crimping to the inner periphery of the transition zone. This transition zone then receives the drive rotor and the stator of the motor. When the motor is electrically powered, it causes the drive rotor of the motor to turn, and consequently causes the transition zone of the crank means to turn, thereby turning the crank means about its support shaft.

More precisely, if the motor is a brushless motor, two configurations are possible. The first configuration consists in fitting the drive rotor and the stator respectively with electromagnetic modules and magnets, while the second configuration consists, on the contrary, in fitting the drive rotor and the stator respectively with magnets and with electromagnetic modules. By powering the electromagnetic modules electrically, the drive rotor of the motor is caused to turn, thereby turning the crank means. The first and second branches of the crank means are thus moved to control the control members of the rotorcraft.

In a second embodiment, the transition zone acts as the drive rotor and surrounds the stator of the motor. The motor is thus completely and totally incorporated within the crank means insofar as the crank means comprises a component element of the motor. This configuration is particularly advantageous from the point of view of weight and size. More precisely, the transition zone is magnetized using magnets placed on the inner periphery of the transition zone. The transition zone then becomes the drive rotor of the motor.

The transition zone thus receives the stator and the drive rotor of the motor, with the transition zone itself acting as the drive rotor. To maximize the result, the first and second branches are advantageously perpendicular to each other. Furthermore, the second branch is longer than the first branch. The control system also advantageously includes motor control means.

In a first variant, the motor control means are outside the motor, whereas in a second variant there are arranged in the stator of the motor. The control system also includes at least one sensor that delivers a signal to the motor, which signal is representative of the operation performed by the flight control means under the control of a pilot. The signal is advantageously delivered to the motor control means, which means adjust the position of the crank means as a function of said signal, using a wireless connection working with electromagnetic waves in the radio, infrared, or microwave range.

BRIEF DESCRIPTION OF THE DRAWINGS

The invention and its advantages appear in greater detail from the following description of embodiments given by way of illustration with reference to the accompanying figures, in which.

Elements that are present in more than one figure are given the same reference in each of them.

DETAILED DESCRIPTION

Figure 1:
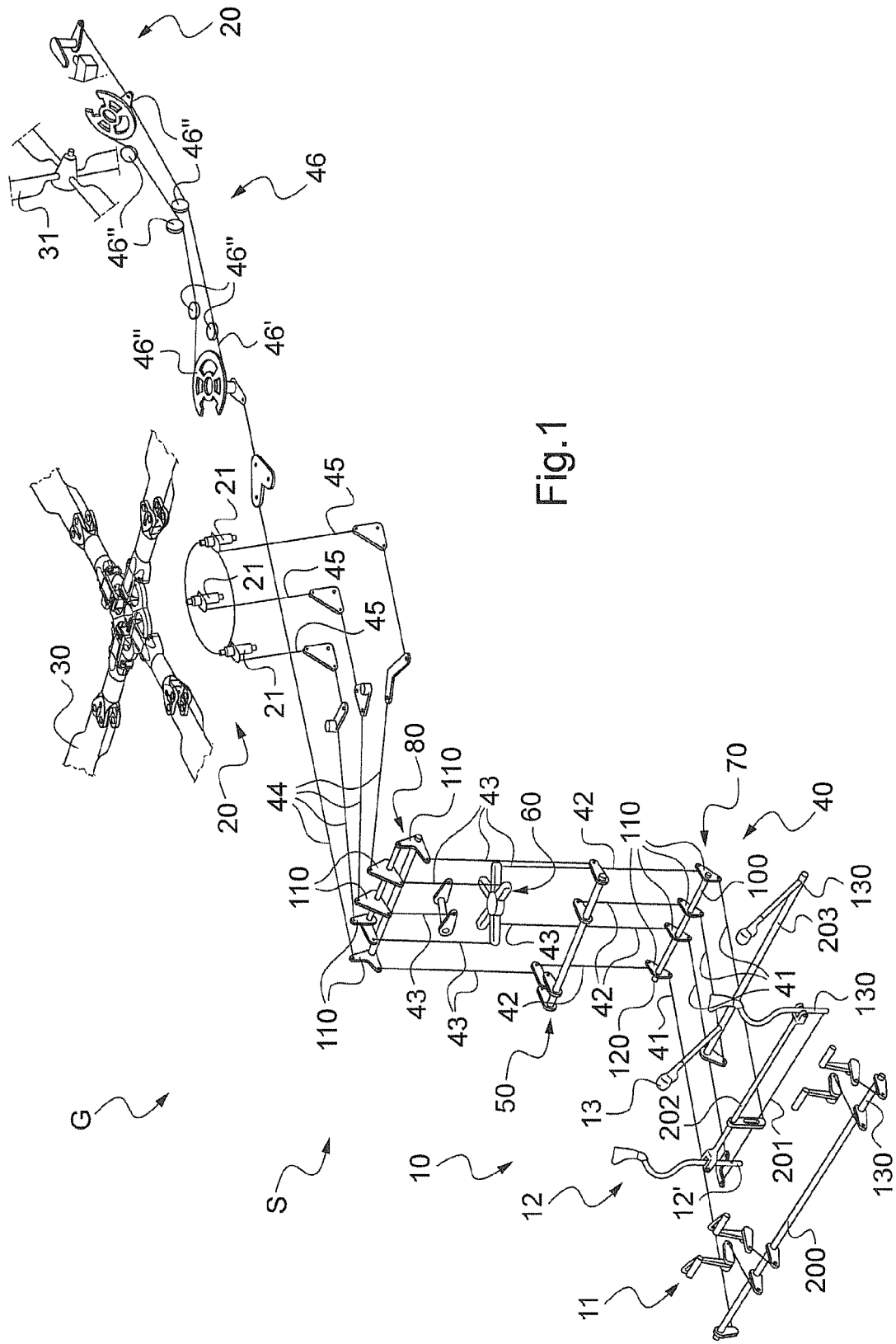
FIG. 1 is an overall view of the assisted control system of a rotorcraft.

FIG. 1 shows a rotorcraft G provided with an assisted control system S of the invention for adjusting the pitch of the main blades 30 of its main lift rotor, and also of the secondary blades 31 of its tail rotor. In order to pilot the rotorcraft G, the pilot has flight control means 10, namely a rudder bar 11 for controlling the yaw of the rotorcraft G with the help of its tail rotor, a cyclic stick 12 for controlling the cyclic pitch of the main blades 30, and a collective pitch lever 13 for adjusting the collective pitch of said main blades 30.

The flight control means 10 are mechanically connected to control members 20 of the main and secondary blades 30 and 31, e.g. servo-controls 21, in order to perform their functions. Thus, the control system S has a mechanical link 40 putting one of the flight control means mechanically into connection with the associated control member(s). The mechanical connection 40 includes a plurality of connecting rods 41, 42, 43, 44, and 45, together with crank means 110. The mechanical connection is provided, more precisely, with four mechanical paths for controlling yaw, for controlling collective pitch, and for controlling cyclic pitch in pitching and in rolling.

The rudder bars 11 are then interconnected by a yaw torque shaft 200, the yaw torque shaft 200 controlling the control member 20 for the secondary blades 31 via a first mechanical connection path 40 that comprises in succession:

- a bottom connecting rod 41;
- crank means 110 of a bottom crank device 70;
- a first intermediate connecting rod 42;
- collective pitch and yaw coupling means 50;
- a second intermediate connecting rod 43;
- crank means 110 of a mixer unit 80;
- a top connecting rod 44; and then
- a control system 46 provided with a control cable 46' and pulleys 46".

Similarly, the collective pitch levers 13 are connected together by a collective pitch torque shaft 203, said collective pitch torque shaft 203 controlling the servo-controls 21 of the control member 20 for the main blades 30 via a second mechanical connection path 40. This second path comprises in succession: a bottom connecting rod 41; crank means 110 of a bottom crank device 70; a first intermediate connecting rod 42; collective pitch and yaw coupling means 50; a second intermediate connecting rod 43; crank means 110 of a mixer unit 80; a top connecting rod 44; and then a final connecting rod 45. In addition, the cyclic sticks 12 are interconnected by a pitch torque shaft 202 and a roll torque shaft 201.

To control the rotorcraft G in roll, the foot 12' of a cyclic stick 12 is connected to a servo-control 21 of the control member 20 for the main blades 30 via a third mechanical connection path 40. This third path comprises in succession: a bottom connecting rod 41; crank means 110 of a bottom crank device 70; a first intermediate connecting rod 42; a phasing unit 60; a second intermediate connecting rod 43; crank means 110 of a mixer unit 80; a top connecting rod 44; and then a final connecting rod 45.

Finally, to control the rotorcraft G in pitch, the pitch torque shaft 201 is connected to two servo-controls 21 of the control member 20 for the main blades 30 via a fourth mechanical connection path 40. This fourth path comprises in succession: a bottom connecting rod 41; crank means 110 of a bottom crank device 70; a first intermediate connecting rod 42; a phasing unit 60; a second intermediate connecting rod 43; crank means 110 of a mixer unit 80; a top connecting rod 44; and then a final connecting rod 45.

Consequently, each flight control means 10 is connected to a control member 20 via a mechanical connection 40 provided with at least one connecting rod 41, 42, 43, 44, 45 that is movable in translation, and at least one crank means 110 that is suitable for pivoting about a stationary support shaft 100 passing therethrough. In general, in operation, the connecting rods are moved in translation along their longitudinal axes, while the crank means are turned about a stationary support shaft 100 passing through them. In accordance with the invention, the control system S assists the pilot so as to reduce the force that needs to be applied to the flight control means 10.

Consequently, the control system S includes at least one sensor 130, in the present example one sensor per flight control means 10, and at least one power-assistance control means per mechanical connection path. In addition, one of the crank means 110 in each path, preferably a crank means of the bottom crank device 70, contains a motor 120 within it.

For example, to modify the collective pitch of the main blades 30, the rotorcraft pilot moves the collective pitch lever 13. The bottom connecting rod 41 connected to said collective pitch lever moves in translation and tends to cause the associated crank means 110 to turn. Simultaneously, a sensor 130 measures the movement of the collective pitch lever 13. this sensor delivers a signal proportional to said displacement to power-assistance control means i.e. motor control means (not shown in the figures). On receiving this signal, the motor control means deliver electricity to the motor 120 of the crank means. The drive rotor of the motor 120 is driven to turn about the support shaft 100, thereby causing the body of the crank means 110 to turn about the support shaft 100.

Consequently, the crank means 110 turns about its support shaft 100 under drive firstly from the bottom intermediate connecting rod 41 and secondly from the motor 120 of the crank means 110. The force that the pilot needs to provide is therefore smaller.

Figure 2:
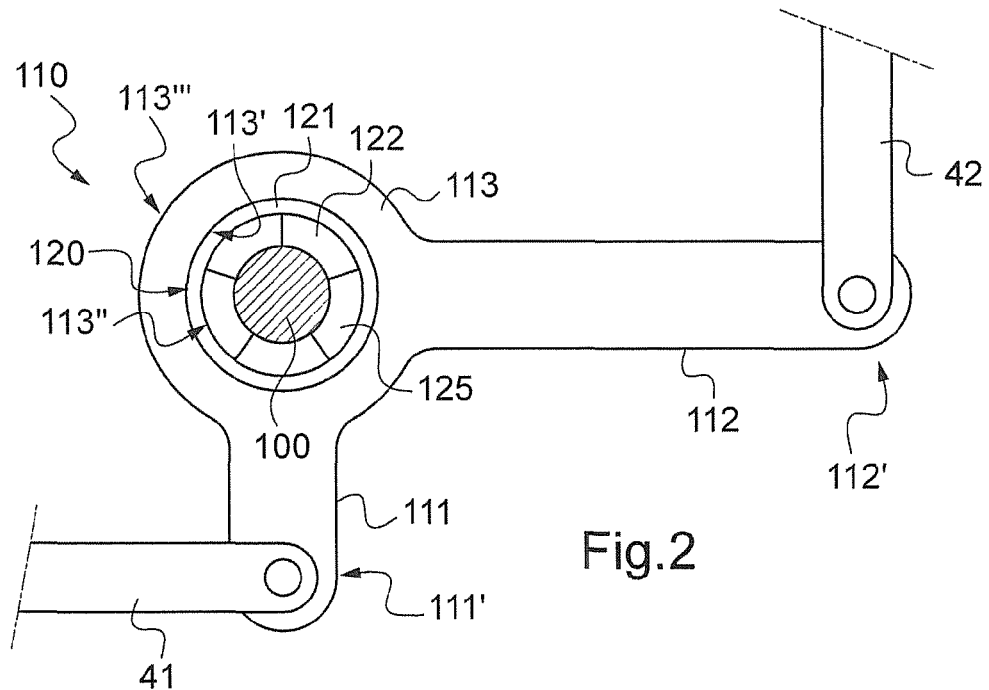
FIG. 2 is a section view of crank means in a first embodiment.
Figure 3:
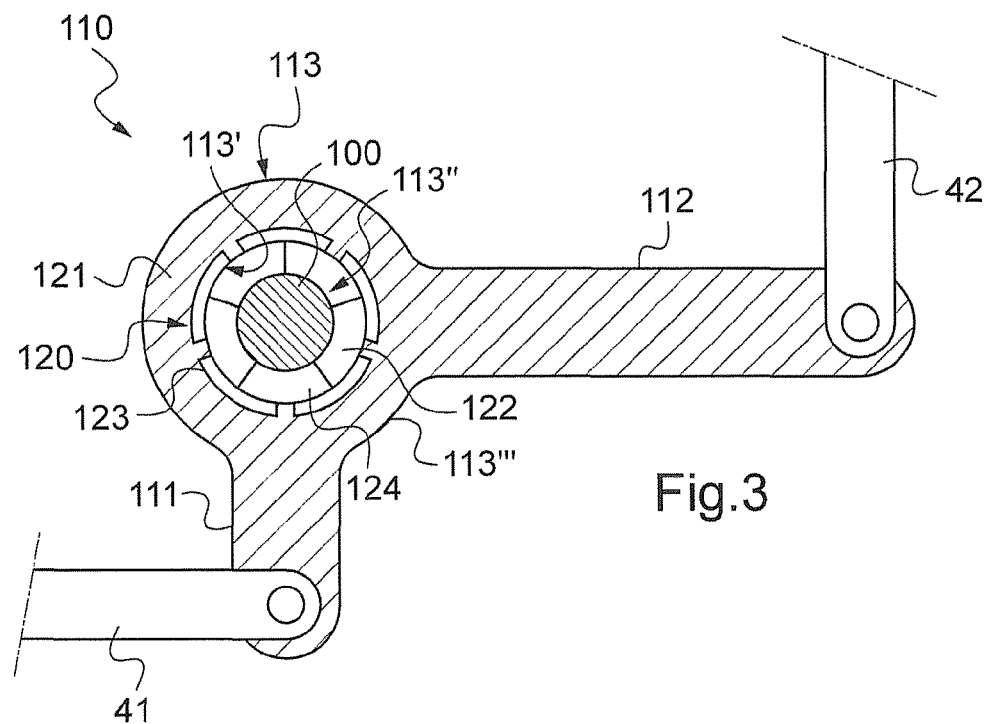
FIG. 3 is a section view of crank means in a second embodiment.

FIGS. 2 and 3 show respective crank means provided with motors 120, specifically brushless motors, in first and second embodiments.

Whatever the embodiment, the body of the crank means 110 includes a transition zone 113 and first and second branches 111 and 112.

The crank means 110 are advantageously part of the bottom crank device 70. Consequently, the crank means 110 is connected to the flight control means 10, e.g. the collective pitch lever 13, via a bottom connecting rod 41 that is hinged to a first distal end 111' of the first branch 111.

Similarly, a second distal end 112' of the second branch is hinged to a first intermediate connecting rod 42 so as to be connected mechanically to a control member 10. In addition, the transition zone 113 is in the form of a hollow cylinder and thus includes a central orifice 113" suitable for receiving at least the stator 122 of the motor 120 and the support shaft 100 of the crank means 110.

Furthermore, the transition zone is provided with a cylindrical outer periphery 113''' and a cylindrical inner periphery 113', the inner periphery 113' facing the central orifice 113". The first and second branches 111 and 112 are also secured to the transition zone, more particularly to the outer periphery 113''' of the transition zone. Since the first and second branches 111 and 112 are perpendicular to each other, the body of the crank means 110 is L-shaped.

Furthermore, it can be seen that the second branch 112 is longer than the first branch 111, thereby creating a movement amplification phenomenon. A small movement of the first branch 111 generates an amplified, i.e. larger, movement of the second branch 112.

Finally, the crank means 110 contains a brushless motor 120. The motor 120 is provided with a drive rotor 121 and a stator 122, the drive rotor 121 being designed to turn relative to the stator 122, which remains stationary. The drive rotor 121 and the stator 122 of the motor 120 are of a conventional type known to the person skilled in the art.

The stator 122 is arranged in the crank means 110, more precisely in the central orifice 113" of the transition zone 113. The stator 122 is fastened by being secured to the support shaft 100 passing through the transition zone 113, by conventional means that are not shown.

In the first embodiment shown diagrammatically in FIG. 2, the drive rotor 121 of the motor 120 is also arranged in the central orifice 113" and it surrounds the stator 122. In addition, the drive rotor 121 is secured, e.g. by adhesive, to the inner periphery 113' of the transition zone 113.

Since the motor is a brushless motor, the stator 122 is provided with a plurality of electromagnetic modules 125, while the drive rotor 121 is magnetized. It should be observed that another configuration is possible, the stator 122 being magnetized while the drive rotor 121 is provided with a plurality of electromagnetic modules 125.

On being powered sequentially, the electromagnetic modules 125 create an electromagnetic field that drives the drive rotor 121 of the motor 120 to turn about the stator 122, and thus about the support shaft 100.

Similarly, the body of the crank means 110 performs an identical rotary movement. Since the drive rotor 121 of the motor 120 can turn about the stator 122, the motor 120 also acts as a bearing for the crank means.

In the second embodiment shown in FIG. 3, the transition zone 113 of the crank means constitute the drive rotor 121 of the motor 120. The inner periphery 113' is then magnetized to act as the drive rotor of the motor 120. Consequently, the inner periphery 113' may be fitted with a plurality of magnets 123.

Thus, in the first embodiment, the transition zone 113 of the crank means is secured to the drive rotor 121, whereas in the second embodiment, the transition zone 113 forms a component part as such of the drive rotor.

Finally, since the control system S includes motor control means, it is possible to envisage arranging the motor control means within the stator of the motor 120. The motor control means (not shown in the figures) are provided with members conventionally used by the person skilled in the art to enable turning movement of the drive rotor 121 to be controlled as a function of a signal received from a sensor 130 of the control system S.

Naturally, the present invention can be subjected to numerous variants as to its implementation. Although several embodiments are described above, it will clearly be understood that it is not conceivable to identify exhaustively all possible embodiments. It is naturally possible to envisage replacing any of the means described by equivalent means without going beyond the ambit of the present invention.

What is claimed is:

1. An assisted control system for controlling the attitude of a rotorcraft comprising:
   a flight control device;
   at least one control member configured to act on an aerodynamic element of the rotorcraft;
   a mechanical connection connecting the flight control device to the at least one control member, the mechanical connection including at least one connecting rod moveable in translation, a crank device pivotably disposed about a stationary support shaft passing through the crank device, and a motor including a drive rotor and a stator configured to facilitate a pivoting movement of the crank device about the stationary support;
   a motor control device configured to control a rotation of the drive rotor relative to the stator; and
   at least one sensor configured to measure information representative of an operation performed by the flight control device under pilot control and to deliver a signal relating to the information to the motor control device, wherein the at least one connecting rod includes a first and second connecting rod, wherein the crank device includes a transition zone and first and second branches secured to the transition zone, wherein the motor is disposed in the transition zone, and wherein the first branch is connected to the flight control device using the first connecting rod and the second branch is connected to the at least one control member using the second connecting rod, and wherein the transition zone is cylindrical and hollow so as to receive at least the stator.

2. The control system as recited in claim 1, wherein the motor includes a brushless motor.

3. The control system as recited in claim 1, wherein the stationary support shaft passes through the transition zone, and wherein the stator is secured to the stationary support shaft.

4. The control system as recited in claim 1, wherein the drive rotor surrounds the stator and is secured to an internal periphery of the transition zone.

5. The control system as recited in claim 1, wherein the drive rotor includes a portion of the transition zone surrounding the stator.

6. The control system as recited in claim 5, wherein the portion of the transition zone includes magnets.

7. The control system as recited in claim 1, wherein the first and the second branches are perpendicular to each other.

8. The control system as recited in claim 7, wherein the second branch is longer than the first branch.

9. The control system as recited in claim 1, wherein the motor control device is configured to adjust a position of the crank device as a function of the signal from the at least one sensor.

10. The control system as recited in claim 1, wherein the signal is delivered to the motor control device by a wireless connection.

11. The control system as recited in claim 1, wherein the at least one sensor includes a displacement sensor.

12. The control system as recited in claim 1, wherein the at least one sensor includes a movement sensor.

13. The control system as recited in claim 1, wherein the motor control device is disposed outside of the motor.

14. The control system as recited in claim 1, wherein the motor control device is disposed inside of the stator.

* * * * *